United States Patent [19]

Chatterjee et al.

[11] Patent Number: 5,604,545
[45] Date of Patent: Feb. 18, 1997

[54] METHODS AND APPARATUS FOR ENHANCING GRAY SCALE IMAGES

[75] Inventors: Chanchal Chatterjee, Lafayette; Vwani P. Roychowdhury, West Lafayette, both of Ind.

[73] Assignee: Purdue Research Foundation, West Lafayette, Ind.

[21] Appl. No.: 272,780

[22] Filed: Jul. 8, 1994

[51] Int. Cl.⁶ .............................. H04N 5/14; H04N 5/20
[52] U.S. Cl. ............. 348/671; 348/28; 382/169; 382/270
[58] Field of Search .................. 348/25, 26, 27, 348/28, 625, 254, 255, 671, 672, 673, 678; 382/169, 270, 271, 272, 273, 274, 275; H04N 5/14, 5/20

[56] References Cited

U.S. PATENT DOCUMENTS

4,561,104  12/1985  Martin ........................... 382/270 X
4,823,194  4/1989  Mishima et al. ................. 348/28 X
5,307,425  4/1994  Otsuka ........................... 382/270 X Primary Examiner—Victor R. Kostak
Assistant Examiner—John W. Miller
Attorney, Agent, or Firm—Perman & Green

[57] ABSTRACT

An image enhancement system that efficiently enhances gray scale images, wherein an analog scene is captured and a resulting analog signal is digitized to a raw gray scale image S. Image S is divided into M disjoint non-empty regions $R_1 \ldots R_M$, where $S_i$ identifies region $R_i$ of S. The raw digitized signal $S_i$ is processed in accordance with an enhancement algorithm to obtain a set of enhancement parameters (offsets $P_i=(s_{ai}, s_{bi})$ and weights ($w_i$)). Digital offsets $P_i=(s_{ai}, s_{bi})$ are converted to analog offsets $Q_i=(v_{ai}, v_{bi})$. The analog signal is stretched and clipped and converted to a digital signal that is an enhanced image signal $T_i$. The enhanced image signal is multiplied by weight $w_i$ to obtain the final enhanced image $U_i$. Image $U_i$ forms the region $R_i$ of a final enhanced image U. The multiplied signals are summed to produce an enhanced summed image of the scene.

21 Claims, 8 Drawing Sheets

METHODS AND APPARATUS FOR ENHANCING GRAY SCALE IMAGES

FIELD OF THE INVENTION

The invention relates generally to the field of electronic circuits, and particularly to image enhancement for visual recognition systems.

BACKGROUND OF THE INVENTION

Imagery is the pictorial or graphical representation of a subject by sensing quantitatively the patterns of electromagnetic radiation emitted by, reflected from, or transmitted through a scene of interest. Basically there are two types of imagery, chemical and electronic.

Chemical imagery or traditional photography relies on the interaction between exposing light from a scene on a photosensitive material in such a manner as ultimately to render visible an image of the incident light exposure distribution. The interaction is between the individual exposure photons of light and the photosensitive elements of the photosensitive material. The resulting image is composed of microscopic picture elements corresponding in position to those photosensitive elements that have received adequate exposure.

Electronic imagery utilizes the sensitivity of various electronic sensors to different bands of the electromagnetic spectrum. The energy received by the sensors is transduced into an electronic signal or electrical effect so that the signal or effect may be processed to display the sensed information. The most common forms of electronic imagery are: television cameras, electronic still cameras, and charge coupled devices, etc. The raw information that makes up the electronic image is in the form of pixels. In a digitized picture a pixel is one of the dots or resolution elements making up the picture.

A picture is not always a satisfactory representation of the original object or scene. The picture may have a poorly chosen gray scale, i.e., it may be overexposed or underexposed. The picture may also be geometrically distorted, or the picture may be blurred or noisy. Image enhancement is the process by which a scene, or one or more portions of a scene, are enhanced so that the scene has more detail or that the scene is more visually appealing and/or contain additional information. The foregoing process is often used to increase the usefulness of microscopy pictures, satellite pictures or reconnaissance pictures. Image enhancement involves the reworking of the raw data after the data has been received. Electronic manipulation of the received data can increase or decrease emphasis, extract data selectively from the total received data, and examine data characteristics that would not show up by normal imagery.

The pixels can be measured one at a time at a rapid rate of speed for brightness and other quantities and over a wide scale of selections. For example, black may equal zero, medium gray may equal 128, and white may equal 255 so that groupings of input information can be made to provide better contrast in pattern and blackness, when the information is regrouped and reassembled for display. Computers have been utilized to process the pixels and enhance the image.

One of the methods utilized by the prior art to enhance images was contrast enhancement. Contrast enhancement transformed every pixel in the image by a continuous or discontinuous function into a new enhanced image. This caused the stetching or compression of contrast of the image.

Another method utilized by the prior art to enhance images was histogram transformation. The histogram transformation constructed a transfer function from the raw gray scale image to the enhanced image.

One of the disadvantages of the contrast enhancement and histogram transformation methods was that the aforementioned methods required computations for every pixel in the gray scale image. Thus, for normal images, e.g., 512 pixels by 480 pixels a large amount of computations are required. This necessitated the use of expensive custom hardware in order to obtain high computation speeds.

Another disadvantage of the prior art is that most image enhancement techniques do not supply feedback to inform the user of the system that different enhancement results may be obtained under different imaging conditions.

An additional disadvantage of the prior art was that some image enhancement techniques do not allow the user to choose gray scale values over different regions of the image.

SUMMARY OF THE INVENTION

The present invention overcomes the disadvantages of the prior art by providing an image enhancement system that efficiently enhances gray scale images. An analog scene is captured and the analog signal is digitized to a raw gray scale image S. Image S is divided into M disjoint non empty regions $R_1 \ldots R_M$. A symbol $S_i$ is issued to identify region $R_i$ of S. The raw digitized signal $S_i$ is processed in accordance with the enhancement algorithm to obtain a set of digital enhancement parameter offsets $P_i=(s_{ai}, s_{bi})$ and weights ($w_i$). Digital offsets $P_i=(S_{ai}, s_{bi})$ are converted to analog offsets $Q_i=(v_{ai}, v_{bi})$. The high and low levels of the analog signal are clipped and converted to a digital signal that is an enhanced image signal $T_i$. The enhanced image signal is multiplied by weight $w_i$ to obtain the final enhanced image $U_i$. Images $U_i$ form the regions $R_i$ of the final enhanced image U.

An advantage of this invention is that the apparatus of this invention may be implemented to execute at very high speeds in almost any central processor.

An additional advantage of this invention is that the apparatus of this invention supplies feedbacks to the operator of the invention so that desired enhancement results may be obtained. The feedbacks include modifications to the camera-lens and illumination conditions, which allows the operator complete control over the final enhancement results.

A further advantage of this invention is that the operator of this invention is able to select a desired gray scale value distribution of the enhanced image, from scene to scene. The foregoing is important in applications where the texture, color and surface qualities of scenes change from sample to sample.

DESCRIPTION OF THE PREFERRED EMBODIMENTS

Figure 1:
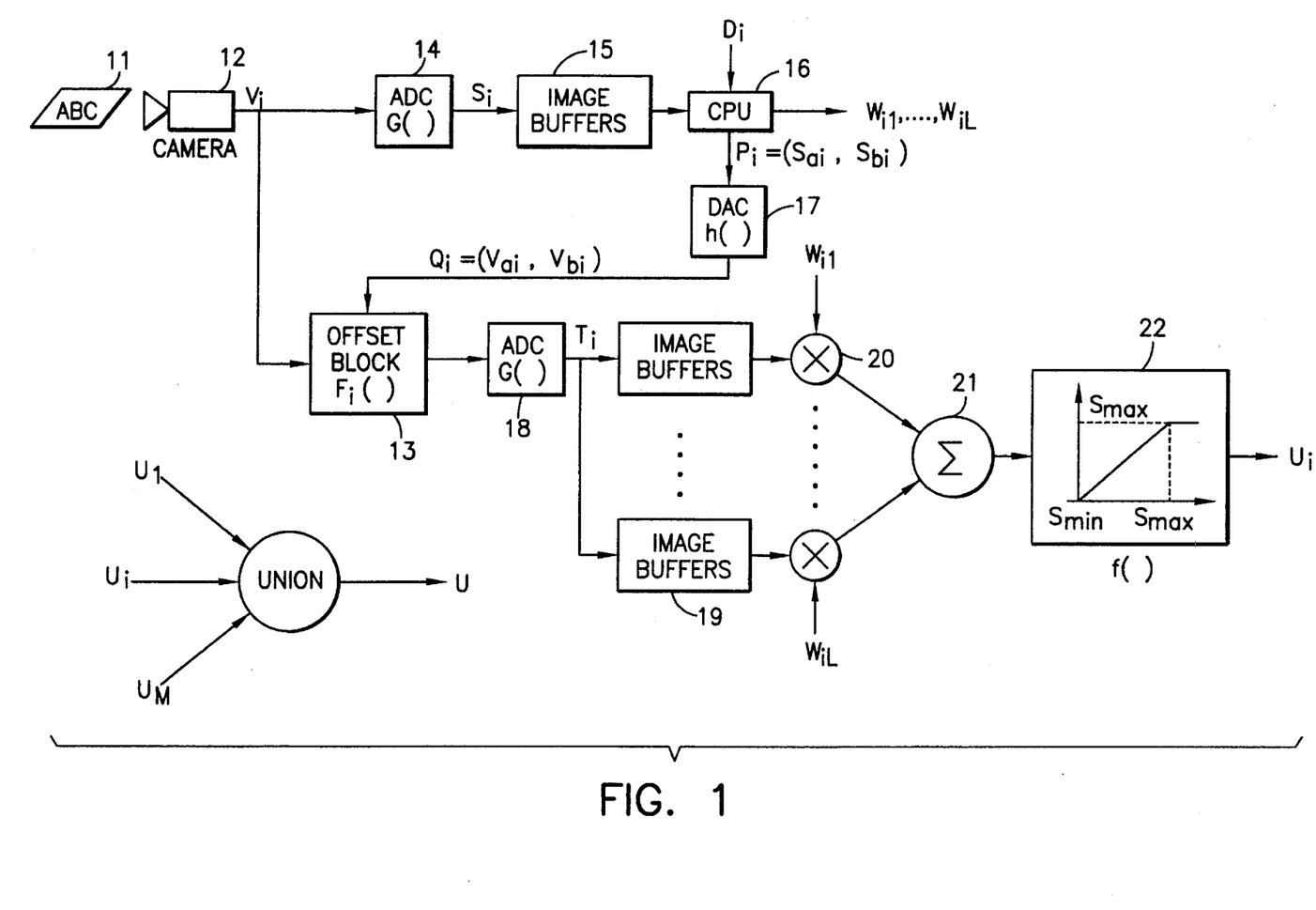
FIG. 1 is a block diagram of the apparatus of this invention.

Referring now to the drawings in detail, and more particularly to FIG. 1, the reference character 11 represents a scene that is captured by image sensor 12. Image sensor 12 may be an electronic camera, video camera, laser, etc. The output of sensor 12 is an analog signal $(V_i)$, that is coupled to analog to digital converter 14. Analog to digital converter 14 digitizes the signal $V_i$ to a raw gray scale image $S_i$ which is stored in image buffer 15. Central processing unit 16 receives the raw digitized signal from buffers 15 and processes this signal in accordance with the enhancement algorithm to obtain a set of digital enhancement parameters (offsets $P_i=(s_{ai}, s_{bi})$ and weights $(w_i)$). The enhancement algorithm is hereinafter disclosed. The processed signal is converted to analog quantities by digital to analog converter 17. The digital enhancement parameters are $P_i=(s_{ai}, s_{bi})$ and the analog enhancement parameters are $Q_i=(v_{ai}, v_{bi})$. The aforementioned analog parameters $Q_i$ are transmitted to offset block 13. Offset block 13 clips the analog signal $V_i$ at the aforementioned signals high and low levels by offsets $Q_i=(V_{ai}, v_{bi})$. The clipped analog signal is transmitted to analog to digital converter 18. Analog to digital converter 18 digitizes the clipped analog signal and transmits L copies of the enhanced image $T_i$ to the input of image buffers 19. There are L image buffers 19. In this embodiment L will be equal to three. Weight $w_i$ is decomposed into a sum of L powers of two weights $w_{ij}$, $j=1 \ldots L$. Image $T_i$ is multiplied by weight $w_{ij}$ by multiplier 20.

The output of multiplier 20 is connected to the input of summer 21. Summer 21 sums the multiplied enhanced image to produce an enhanced summed image of the scene at its output. The enhanced summed image of the scene may now be utilized for any purpose that is known in the art.

The output of summer 21 i.e. the enhanced summed image is passed through an activation function 22 illustrated by the graph to the right of summer 21. Any digitized gray scale value within $S_{min}$ and $S_{max}$ is passed as is. Any value exceeding $S_{max}$ is truncated to $S_{max}$ and any value below $S_{min}$ is truncated to $S_{min}$.

The enhancing algorithm that is utilized by central processing unit 16 will be presented below in two steps:

Step 1

From a set of representative images, the model constants are estimated. This step is performed in an off-line process where the speed of the implementation is not critical. This step is usually performed once at the beginning of the experiment. However, the implementations presented in this invention are efficient and can be executed at high speeds.

Step 2

In this step, the enhanced image is generated from known model constants, and from user-specified desired gray values. The execution speed of this step is critical, since this step is performed repeatedly for every different image to be enhanced.

An algorithm to estimate model constants will be discussed hereinafter under the subheading Computation of Model Constants. A separate algorithm is discussed hereinafter under the subheading Estimation of Upper Limit $g_{max}$ of gain g.

In our notations, we shall use upper case letters for images or vectors. Lower cases will be used for variable such as gray scale values or offsets. Although functions are defined for scalars, we shall use vectors as parameters for functions, where the functions are applied to each element of the vector.

Let $V \in \Re^N$ be an input analog image signal and $S \in \Re^N$ be a digitized ray gray scale image obtained by digitizing signal V to image S, where N is the number of digitized pixels. Note that input V can come from many sources such as sensors (cameras, lasers, etc.) or stored analog image signals. Within S, we shall identify $M(1 \leq M \leq N)$ disjoint non empty regions $(R_1 \ldots R_M)$ to be enhanced by our algorithm. Each Region $R_i$ of S consists of a subset $S_i \subset S$ of contiguous picture points. We shall define $s_i$ as a measure for the set $S_i$, where $s_i$ is the mean of $S_i$ $i=1 \ldots M$, although, in general, $s_i$ can be any other measure such as the median, weighted average, standard deviation or random sample of the set $S_i$.

Let $(s_{min}, s_{max})$ be the complete range of the gray scale values in S. The permissible input range $(v_{min}, v_{max})$ is obtained by the transform h (see below) of $(s_{min}, s_{max})$, i.e. $v_{min}=h(s_{min})$ and $v_{max}=h(s_{max})$. Define $\theta=\{v \in \Re | v_{min} \leq v \leq v_{max}\}$, and $\Phi=\{s \in \Re | s_{min} \leq s \leq s_{max}\}$.

The analog to digital converter (ADC) is a surjective map $g:\theta \to \Phi$, where $g^{-1}$ does not exist. However, we shall define $h:s | \to v$, where s is a gray scale value in image S and v is the mean of the analog values that are digitized to s. Thus $h:\Phi \to \theta$ is a bijective linear map. Also define $V_i=h(S_i)$.

For every region $R_i$ of S, the proposed algorithm allows the user to select a desired gray scale value $d_i \in \Phi$. Let U be the final enhanced image such that the mean gray scale value $u_i$ for any region $R_i$ within U equals $d_i$ for $i=1 \ldots M$.

For each region $R_i$ of S we shall compute a set of digital parameters $P_i=(s_{ai}, s_{bi})$ and weight $w_i$. $P_i$ includes a low offset $s_{ai}$, and a high offset $s_{bi}$ which are transformed by the digital to analog converter (DAC)(h) to analog offsets $Q_i=(v_{ai}, v_{bi})$. Parameters $Q_i$ are used to modify (offset) the input signal $V_i$ by affine functions $F_i():\theta \to \theta$ where $$F_i(v) = \begin{cases} v_{max} \text{ for } v > v_{max} \\ \dfrac{(v_{max}-v_{min})}{(v_{bi}-v_{ai})}(v-v_{ai}) + \\ v_{min} \text{ for } v_{ai} \leq v \leq v_{bi}, i=1,\ldots,M \\ v_{min} \text{ for } v < v_{min} \end{cases}$$

The modified input $F_i(V_i)$ is digitized by ADC to enhance image $T_i$. Image $T_i$ is multiplied by weight $w_i$ and passed through the activation function f() to obtain an enhanced image. Note that we have multiplied weight $w_i$ to enhanced image $T_i$ instead of inputs $v_i$ or $F_i(v_i)$. This is because most ADCs have the hardware to modify the input $V_i$ but do not have a method of multiplying $V_i$ by weight $w_i$. Approximating g to a linear function $\hat{g}$, $\hat{g}(w_iF_i(V_i))=w_i\hat{g}(F_i(V_i))=w_iT_i$. Therefore, multiplying $F_i(V_i)$ by $w_i$ is the same as multiplying $T_i$ by $w_i$ under this approximation.

In the proposed approach, our concern is to generate enhanced images from inputs $V_i$ irrespective of their source. We shall, therefore, not use the actual measured value of input analog signal $V_i$ or its modified value $F_i(v_i)$. Instead, the raw gray scale image S and enhanced images $T_i$, are used in our computations.

In our application, we shall present an efficient implementation of the analytical models with an ADC. In the framework established above, the ADC performs two functions: (1) affine transformation $F_i()$, and (2) digitization $g()$. Note that although the analysis is carried out for the ADC, the general method described above can be applied to any hardware which conforms to functions $F_i()$ and $g()$ defined in our models.

Enhancement Model

We shall present an enhancement model to fit the non-idealities found in many common analog to digital converters (ADCs). Considering these non-idealities and ignoring second order error terms, we get the following expression for enhanced images $T_i$ (see FIG. 1), where $t_i \in T_i$:

$$t_i = g_i s_i + k_i g_i s_{ai} + k_2 s_{ai} + k_3 s_i + k_4, \quad i=1 \ldots M, \quad t_i \in \Phi \tag{1}$$

Here $g_i$ is the gain:

$$g_i = \frac{(v_{max} - V_{min})}{(V_{bi} - V_{ai})} = \frac{(S_{max} - S_{min})}{(S_{bi} - S_{ai})}, \quad i=1 \ldots M \tag{2}$$

In (1), when $s_{ai} = s_{min}$, and $s_{bi} = s_{max}$ we call it the full range operation. Output gray scale values $s_i$ at full range are called the full range gray scale values. Note that $s_i$ and $t_i$ represent the ideal digitized values of $v_i$ and $F_i(v_i)$ respectively. The actual gray scale values are a round-off (quantization) of the ideal values.

Next the enhanced images U are obtained by the weighted sum of image $T_i$ with weights $w_i$. Here $\{U_i, \ldots U_M\}$ form regions $\{R_i, \ldots, R_M\}$ respectively of the final enhanced image U. Thus, $$U_i = f(w_i T_i), \; i = 1 \ldots M, \; \text{where } f(s) = \begin{cases} s_{max}, & s > s_{max} s, \\ s_{min}, \leq s \leq s_{max}, \text{ and } U = \bigcup_{i=1}^{M} U_i \\ s_{min}, & s < s_{min} \end{cases} \tag{3}$$

As defined before, $s_i$ is a mean (or any other measure) of the raw image $S_i$. Similarly $t_i$ and $u_i$ are the means (or any other measures) of enhanced images $T_i$ and $U_i$ respectively.

In (l), ($k_1$, $k_2$, $k_3$, $k_4$) are unknown real-valued model constants. The ideal values are: $k_1=1$, $k_2=k_3=0$. $k_4$ represents any bias in the system. Ideally for an unbiased system, $k_4 = s_{min}$ which is usually 0. It is clear from (1), that for unknown ($k_1$, $k_2$, $k_3$, $k_4$), the true values of $s_i$ are unknown. Only the measured values $m_i$ are obtained at full range operation as:

$$m_i = (l + k_3) s_i + (k_1 + k_2) s_{min} + k_4, \quad i=1 \ldots M \tag{4}$$

We shall call $m_i$ the measured full range gray scale values.

Perhaps it can be demonstrated that (1) can be derived by assuming non-idealities for other parameters or by assuming different non-idealities for the same parameters. However, our experiments show that (1), independent of its derivation, appropriately represents the non ideal system under discussion.

Computation of Model Constants

Before estimating ($k_1$, $k_2$, $k_3$, $k_4$) we should compute the upper limit $g_{max}$ of gain $g_i$ by the algorithm under the subheading estimation of upper limit $g_{max}$ of Gain g and also identify M regions $\{R, \ldots, R\}$ for enhancement. From the estimate of $g_{max}$ we obtain the following operating range for offsets ($s_{ai}$, $s_{bi}$) ( derived from (2)):

$$s_{ai} + \frac{s_{max} - s_{min}}{g_{max}} \leq s_{bi}, \; (s_{ai}, s_{bi}) \in \phi^2 \tag{5}$$

It is clear from (1) that the full range gray scale values $s_i$, $i=1 \ldots M$, are unknown variables in estimating constants ($k_1$, $k_2$, $k_3$, $k_4$). For this reason, we shall also estimate $s_i$ along with model constants ($k_1$, $k_2$, $k_3$, $k_4$) as follows:

(1) For each region $R_i$, $i=1 \ldots M$, choose K offsets ($s_{ak}$, $s_{bk}$), $k=1 \ldots K$, within constraint (5), and compute $g_k$ by (2).

(2) For each ($s_{ak}$, $s_{bk}$) acquire an image and estimate $t_{ik}$ by averaging gray scale values within $R_i$. Note that estimates of $t_{ik}$ can be obtained by other methods such as choosing a median, or random sample of gray scale values within $R_i$. Eliminate those $t_{ik}$ that are close to $s_{min}$ and $s_{max}$.

(3) Equation (1) can be written in the following matrix form for each region $R_i$:

$$[l \; s_{ak} \; g_k s_{ak} \; g_k] \begin{bmatrix} k_3 s_i + k_4 \\ k_2 \\ k_1 \\ s_i \end{bmatrix} = [t_{ik}], \; i=1 \ldots M, \; k=1 \ldots K \tag{6}$$

The above equation is solved by the least squares method.

(4) Final estimates of ($k_1$, $k_2$) are obtained by averaging M estimates of ($k_1$, $k_2$) from M regions.

(5) From the M estimates of $s_i$ and $k_3 s_i + k_4$, $i=1 \ldots M$, obtained above (6), we can estimate $k_3$ and $k_4$ by least squares method from the following equations:

$$k_3 = \frac{M \sum_{i=1}^{M} s_i(k_3 s_i + k_4) - \sum_{i=1}^{m} s_i \sum_{i=1}^{M} (k_3 s_i + k_4)}{M \sum_{i=1}^{M} s_i^2 - \left(\sum_{i=1}^{M} s_i\right)^2} \tag{7}$$

$$k_3 = \frac{M \sum_{i=1}^{M} s_i^2 \sum_{i=1}^{M} (k_3 s_i + k_4) - \sum_{i=1}^{M} s_i \sum_{i=1}^{M} (k_3 s_i + k_4)}{M \sum_{i=1}^{M} s_i^2 - \left(\sum_{i=1}^{M} s_i\right)^2} \tag{8}$$

Experimental Results

The above algorithm for the estimation of model constants ($k_1$, $k_2$, $k_3$, $k_4$) is applied on a set of industrial samples of steel. Constants ($k_1$, $k_2$, $k_3$, $k_4$) estimated from 8 different parts are shown in Table 1 below:

TABLE 1

MODEL CONSTANTS ($k_1$, $k_2$, $k_3$, $k_4$) ESTIMATED FROM 8 DIFFERENT PARTS

| Samples | $k_1$ | $k_2$ | $k_3$ | $k_4$ |
| --- | --- | --- | --- | --- |
| 1 | −1.0480 | −0.0270 | 0.590 | −6.3590 |
| 2 | −1.0284 | −0.0106 | 0.0550 | −6.0056 |
| 3 | −1.0044 | −0.0374 | 0.0550 | −6.1488 |
| 4 | −1.0210 | −0.0210 | 0.0542 | −5.9058 |
| 5 | −1.0110 | −0.0378 | 0.0582 | −6.0118 |
| 6 | −1.0300 | −0.0108 | 0.0496 | −5.6976 |
| 7 | −1.0354 | −0.0056 | 0.0564 | −6.1598 |
| 8 | −1.0196 | −0.0244 | 0.0518 | −5.2660 |

The table shows:

(1) Estimates of model constants ($k_1$, $k_2$, $k_3$) are close to their ideal values (ideal $k_1=1$, $k_2=k_3=0$, $k_4=s_{min}=0$).

(2) Estimate of bias constant $k_4$ is different from its ideal value of $s_{min}=0$. This result demonstrates that the ADC system has a bias that is represented by $k_4$, and the enhancement model (in (1)) has helped us arrive at accurate enhanced images, which can not be obtained without this model.

Estimation of Upper Limit $g_{max}$ of ADC Gain g

In order to maintain the linearity assumptions made for (l), we should determine operating ranges of offsets $s_a$ and $s_b$. For this reason, we shall first determine the range ($g_{mingmax}$) for gain g. It is clear from (1) and (2) that the lower limit $g_{min}$ of g is obtained for the full range operation (i.e. $s_{a=smin}$, $s_b=s_{max}$) where g=1.

Before determining the upper limit $g_{max}$ of g, we should establish the experimental conditions to acquire valid data to properly estimate $g_{max}$. Since setting offsets ($s_a$, $s_b$) decreases the dynamic range of input V, we should make sure that V is well distributed within $\theta=[v_{min}, v_{max}]$ for g=1. If input is distributed close to limits $v_{min}$ or $v_{max}$ for g=1, setting offsets ($V_a$, $V_b$) will further limit V, and reduce the availability of reliable data for accurate estimation of $g_{max}$. An easy way to check this condition, is to acquire an image S, and measure gray scale values at different regions of interest within the image. If these gray scale values are distributed close to $s_{min}$ or $s_{max}$, the optical setup conditions such as lens aperture and illumination should be reconfigured so that they are within ($s_{min}$, $s_{max}$).

Estimate $g_{max}$ by the following steps:
1. Place a part under the camera with the optical condition established above.
2. Select M (M≧2) regions of interest $\{R_1, \ldots R_M\}$ within the image.
3. Start from the first region $R_1$, i.e. $R_i=R_1$, where index i is the $i^{th}$ estimate of $g_{max}$ from region $R_1$.
4. Assuming a "reasonable" value $g_{start} \geq 1$ of $g_{max}$ (say $g_{start}=1.5$), estimate model constants ($k_1, k_2, k_3, k_4$).
5. Choose a set of K offsets ($s_{ak}, s_{bk}$), k=1 ... K, within constraint (5).
6. For each choice of offset ($s_{ak}, s_{bk}$), k=1 ... K, perform the following steps:
   6.1 Acquire an image with offsets ($s_{ak}, s_{bk}$).
   6.2 From this acquired image measure gray scale value $t_{ik\_measured}$ by averaging gray scale values within region $R_i$. Eliminate values that are close to $s_{min}$ and $s_{max}$.
   6.3 Compute gray scale value $t_{ik\_computed}$ from (1).
   6.4 Compute the error ($e_k$) between the measured and computed gray scale values i.e. $e_k=t_{ik\_measured} - t_{ik\_computed}$.
   6.5 compute gain $g_k$ from (2).
7. Choosing a limit $e_{max}$ of error $e_k$ k=1 ... K, estimate the upper limit $g_{max}^{R_1}$ of gain g from region $R_1$.
8. If $g_{max}^{R_1} < g_{max}$ then set $g_{start}=g_{max}^{R_i}$ and repeat steps 4–7 till $g_{max}^{R_1} \geq g_{start}$.
9. If $g_{max}^{R_i} \geq g_{start}$, then report $g_{max}^{R_i}$ as the estimate of $g_{max}$ from region $R_i$.
10. Repeat steps 5–9 for all selected regions $R_1, \ldots, R_M$.
11. Choose the final estimate $g_{max}$ as the minimum value of all estimates: $g_{max}=\min\{g_{max}^{R_i}, i=1 \ldots M\}$.

Appropriate Selection of M Regions $\{R_1, \ldots, R_M\}$.

Here we shall first partition the image into M disjoint non empty regions of interest $\{R_1, \ldots, R_M\}$. The M regions are usually chosen by pre-defined criteria dependent on the application. For example, in an image with multiple parts on a background, each part and the background form regions $\{R_1, \ldots R_M\}$. Instead of using the entire region $R_1$ for our computations, a small probing window within $R_1$ is chosen to reduce computational complexity.

Generation of Desired Enhanced Image

This analysis involves efficient estimation of offsets ($s_{ai}$, $s_{bi}$) and weights $w_i$, i=1 ... M, from: (1) known model constants ($k_1, k_2, k_3, k_4$), and (2) user-specified desired gray scale values ($d_1, \ldots, d_M$) for regions $\{R_1, \ldots, R_M\}$ respectively. The enhanced gray scale image $T_i$ is obtained by modifying input $V_i$ by estimated offsets ($s_{ai}, s_{bi}$). The final enhanced image $U_i=w_i T_i$, where weights $w_i$ are generated by our algorithm. From (1) and (3), $$d_i=w_i(g_i s_i+k_1 g_i s_{ai}+k_2 s_{ai}+k_3 s_i+k_4), \; i=1 \ldots M, \text{ where } d_i \epsilon \phi \quad (9)$$

Figure 3A:
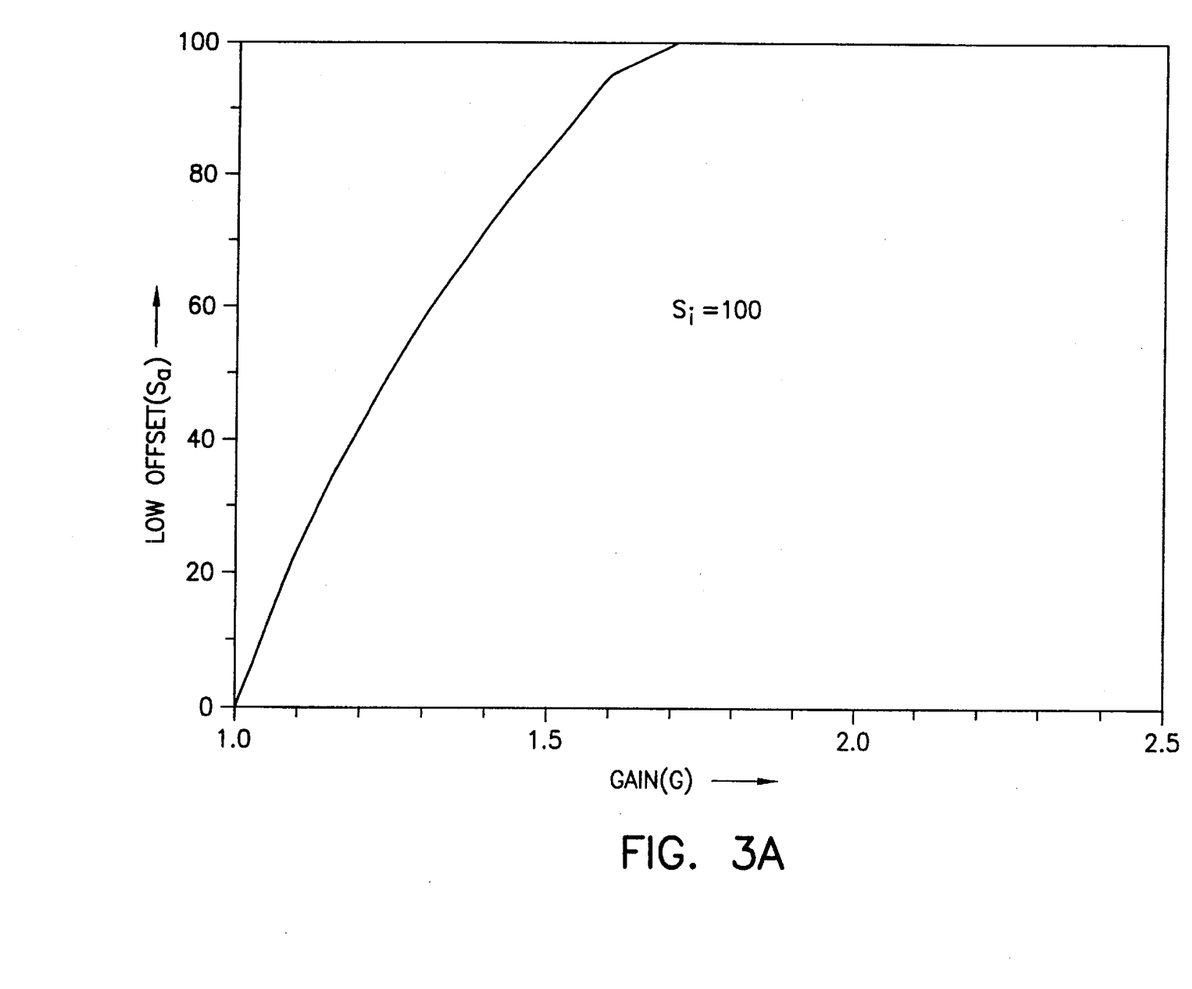
FIG. 3A is a graph showing a range $R(s_a, s_b) \epsilon \Phi^2$ of low offset $s_{ai}$ for different values of ADC gain for full range gray scale value $s_f=100$.
Figure 3B:
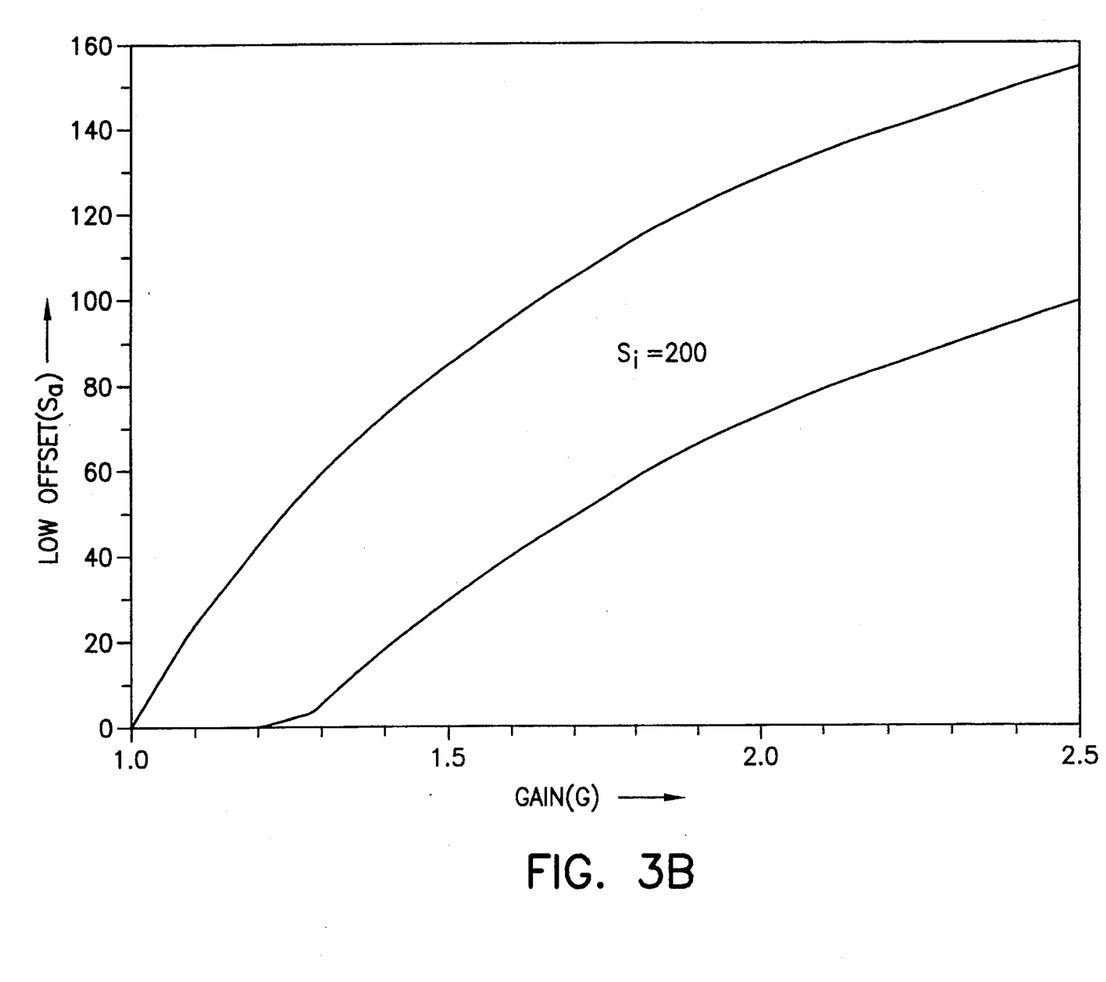
FIG. 3B is a graph showing a range $R(s_{ai})$ of low offsets $s_{ai}$ for different values of ADC gains $g_i$ for full range gray scale values $S_f=200$.

We shall first determine a range $R(s_{ai})$ of low offset $s_{ai}$, $R(g_i)$ of gain $g_i$ and $R(w_i)$ of weight $w_i$, such that when these parameters are within their respective ranges, we shall obtain enhanced gray scale values $t_i \epsilon \Phi$ where $t_i \epsilon T_i$. $R(s_{ai})$ is shown below (derived from (5) and $t_i \epsilon \Phi$ in (1)):

$$R(s_{ai}):\max\left(s_i - \frac{s_{max}-s_{min}}{g_i}, s_{min}\right) \leq s_{ai} \leq \min\left(s_{max} - \frac{s_{max}-s_{min}}{g_i}, s_i\right) \quad (10)$$

A plot of $s_{ai}$ against different values of $g_i$ is shown in FIG. 3 for $s_i=100$ (FIG. 3A) and $s_i=200$ (FIG. 3B).

In (2) we can choose ($s_{ai}, s_{bi}$) such that $1 < g_i < s_{max} - s_{min}$. However, the linearity assumptions of ADC(g) in (1) are invalid for $g_i > g_{max}$ ($g_{max} < s_{max} - s_{min}$) where $g_{max}$ is determined experimentally. We, therefore, have the following permissible range $R(g_i)$ for gain $g_i$.

$$R(g_i): 1 \leq g_i \leq g_{max} \quad (11)$$

It is clear from (9) that given any ($g_i, s_{ai}$) we can obtain the desired $d_i$ by adjusting weight $w_i$. It is therefore, not so interesting to study the solution to (9) for any arbitrary weight $w_i$. Since there can be several choices of $w_i \leq 0$, the optimum choice may be determined from computational considerations. The best choice is 1, which requires no more processing than a simple image acquisition. In one example, it took us 144 seconds to multiply an entire image (512×480 pixel resolution) with a weight, whereas it took, us 33 ms to acquire an image. If $w_i=1$ is not a valid solution for (9), choose $w_i$ closest to 1. Multiplying by $w_i>1 (w_i<1)$ may raise (lower) some gray values above (below) $s_{max}(s_{min})$ which are truncated to $s_{max}(s_{min})$ by activation function f() in FIG. 1. Choosing $w_i$ closest to 1 minimizes this loss of accuracy due to truncation. We shall, therefore, solve (9) for $w_i$ closest to 1. An efficient method of multiplying enhanced image $T_i$ with $w_i \neq 1$ is discussed herein.

Compute ($g_i, s_{ai}$) by the following algorithm:
(1) Choose the starting value of $w_i=1$.
(2) Choose the starting value of $g_i=1$.
(3) Check if $s_{ai}$ satisfies the following inequality (obtained from (9) and (10)):

$$s_{ai} = \frac{d_i - w_i(g_i+k_3)s_i - w_i k_4}{w_i(k_1 g_i+k_3)} \epsilon R(s_{ai}) \quad (12)$$

(4) If $s_{ai}$ does not satisfy (12), increment $g_i$ (by say 0.1) and go back to step 3.

(5) If $s_{ai}$ satisfies (12), report $g_i$, $s_{ai}$ and $w_i$ and terminate the algorithm.
(6) Continue the search till $g_i = g_{max}$. If $g_{max}$ does not satisfy (12) check the following:
  (6.1) If $s_{ai}$ computed from (12) with $g_i = g_{max}$ exceeds the upper limit in $R(s_{ai})$ then increment $w_i$ by $2^{-L}$ where L is determined in a later section.
  (6.2) If $s_{ai}$ computed from (12) with $g_i = g_{max}$ is below the lower limit in $R(s_{ai})$ then decrement $w_i$ by $2^{-L}$.
  (6.3) Go back to step 2.

Note that the algorithm chooses the smallest permissible value of $g_i$, because the linearity assumption of the ADC is strongest for $g_i$ closest to 1. Parameter $s_{bi}$ is obtained as $$s_{bi} = s_{ai} + \frac{s_{max} - s_{min}}{g_i}$$

Permissible Range of Desired Gray Scale Values $d_i$, i=1 ... M

Here we shall study a range $R(d_i)$ of desired gray scale values $d_i$, so that when $d_i$ are chosen within $R(d_i)$, we can obtain an enhanced image by our algorithm. As seen before, we can obtain any value of $d_i$ by appropriately adjusting values of weight $w_i$. It is, therefore, not so interesting to study the model for any arbitrary weight $w_i$. It is, however, important to obtain the desired gray scale value $d_i$ with $w_i = 1$ in order to reduce computation.

If we select $d_i \notin R(d_i)$, we have three choices:
(1) We can choose a weight $w_i$ such that $d_i$ can be obtained. This is the less preferable option due to computational considerations.
(2) From a plot of $R(d_i)$ choose "satisfactory" values of $d_i$ within it.
(3) Obtain guidelines to change the optical/illumination setup to attain $d_i$ with our algorithm.

Assuming $(k_1, k_2, k_3, k_4)$ close to their ideal values, we obtain:

$$R(d_i): \min_{\substack{g_i \in R(g_i) \\ s_{ai} \in R(s_{ai})}} \{(g_i + k_3)s_i + (k_1 g_i + k_2)s_{ai} + k_4 \leq d_i\} \leq \qquad (13)$$

$$\max_{\substack{g_i \in R(g_i) \\ s_{ai} \in R(s_{ai})}} \{(g_i + k_3)s_i + (k_1 g_i + k_2)s_{ai} + k_4 \} \quad d_i \in \phi$$

For the ideal case, the above equation can be simplified to the following:

$$R(d_i): \min_{\substack{g_i \in R(g_i) \\ s_{ai} \in R(s_{ai})}} \{g_i s_i - g_i s_{ai} + s_{min}\} \leq d_i \leq \qquad (14)$$

$$\max_{\substack{g_i \in R(g_i) \\ s_{ai} \in R(s_{ai})}} \{g_i s_i - g_i s_{ai} + s_{min}\} d_i \in \phi$$

Figure 5A:
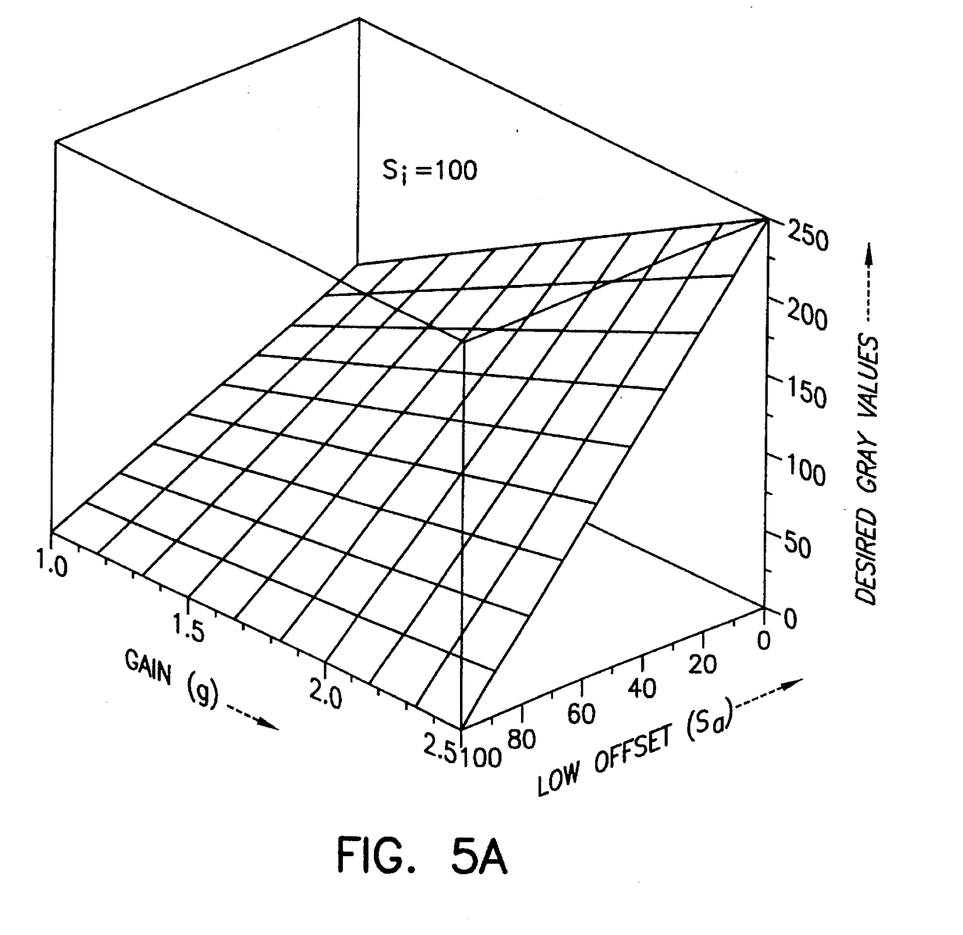
FIG. 5A is a drawing of desired gray scale values $d_i$ that can be obtained for different values of low offset $s_{ai}$ and ADC gain $g_i$ for full range gray scale value $s_f=100$.
Figure 5B:
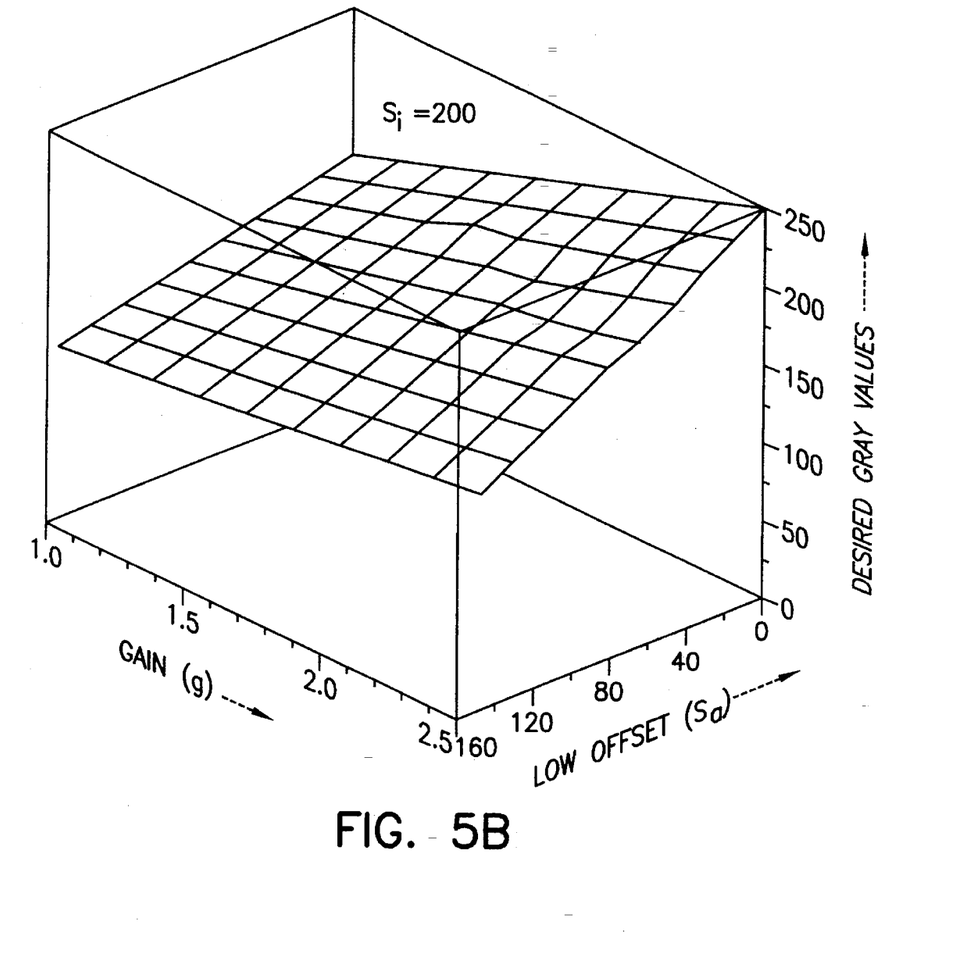
FIG. 5B is a drawing of desired gray scale values $d_i$ that can be obtained for different values of low offset $s_{ai}$ and ADC gain $g_i$ for full range gray scale value $s_f=200$.

A plot of $R(d_i)$ for this case is shown in FIG. 5. Here we observe that for $s_i = 100$, we can obtain all values of $d_i$ with our algorithm. For $s_i = 200$, we can only obtain higher values of $d_i > 123$. Thus, low values of $s_i$ gives us greater choices of $d_i$.

If our choice of $d_i \notin R(d_i)$, we need to reconfigure the imaging conditions (such as by adjusting the camera-lens or illumination setup) so that $d_i \in R(d_i)$. In (13), $R(d_i)$ depends on $s_i$ and we observed in FIG. 5 that appropriate choices of $s_i$ gives us wider choices of $d_i$. We, therefore, need to find a range $R(s_i)$ for $s_i$ such that if $s_i \in R(s_i)$ then $d_i$ can be obtained with our algorithm. Assuming $(k_1, k_2, k_3, k_4)$ close to their ideal values:

$$R(s_i): \min_{\substack{g_i \in R(g_i) \\ s_{ai} \in R(s_{ai})}} \left\{ \frac{d_i - (k_1 g_i + k_2)s_{ai} - k_4}{g_i + k_3} \right\} \leq s_i \leq \qquad (15)$$

$$\max_{\substack{g_i \in R(g_i) \\ s_{ai} \in R(s_{ai})}} \left\{ \frac{d_i - (k_1 g_i + k_2)s_{ai} - k_4}{g_i + k_3)} \right\} s_i \in \phi$$

Figure 6:
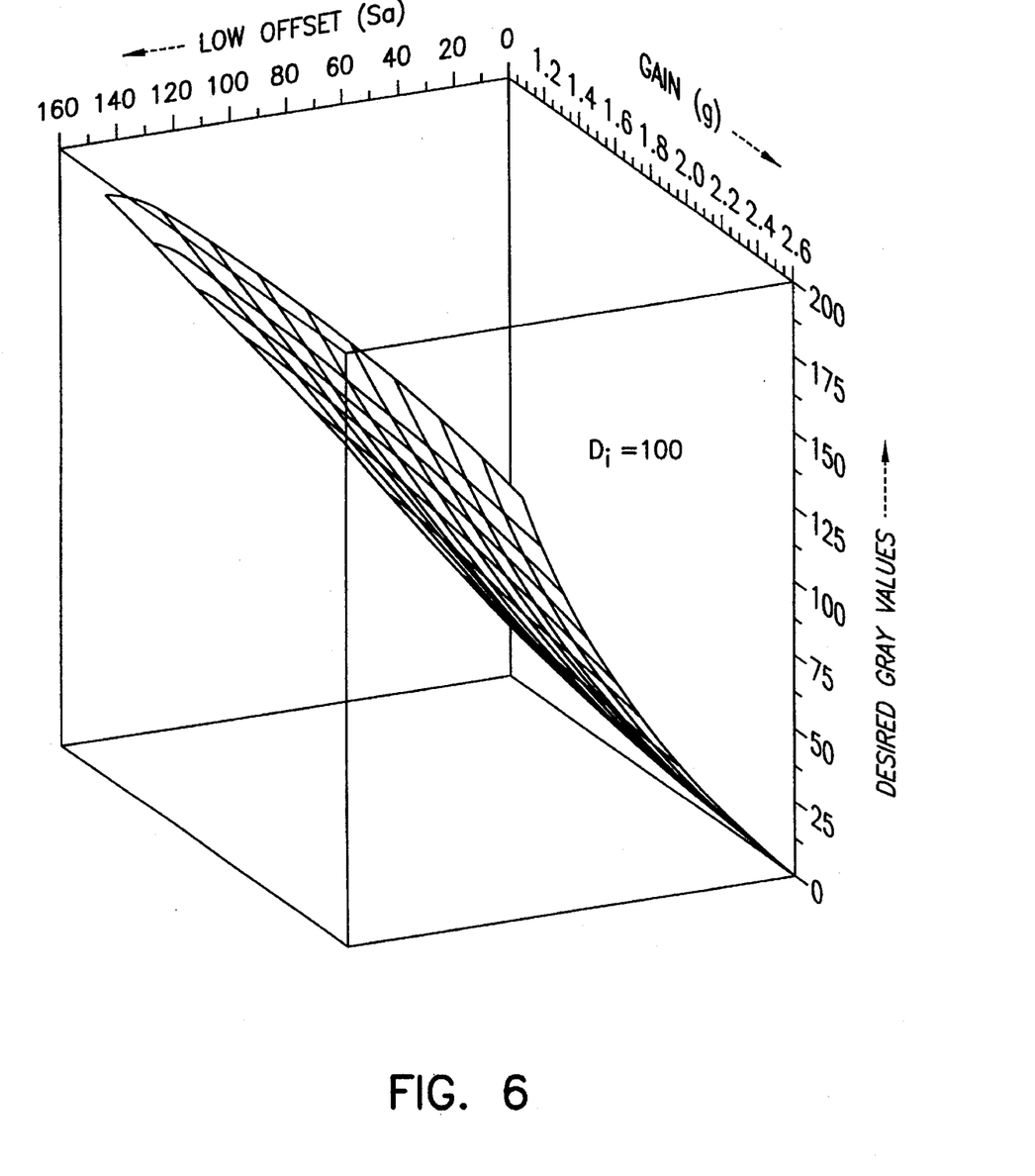
FIG. 6 is a drawing of full range gray scale values $s_i$ for different values of low offset $s_{ai}$ and ADC gain $g_i$ for $d_i=100$.

A plot of $s_i$ against different values of $g_i$ and $s_{ai}$ is shown in FIG. 6. To change the imaging conditions, the camera-lens and illumination setup are reconfigured so that $s_i \in R(s_i)$.

Weighted Sum of L Enhanced Images

Among the computations involved in the algorithms described above, it is the multiplication by weight $w_i$ that makes it difficult to implement the method with digital hardware. If $w_i = 1$ is not a feasible choice, we have the following disadvantages:
1. It is usually computationally inefficient to multiply an entire image with a number.
2. Multiplication with any number, especially noninteger numbers, can cause loss of gray scale value information due to roundoff or truncation.

In most image processors it is simpler to add or subtract images than to multiply an image with a number. In one example, we added/subtracted two images (512×480 pixel resolution) in 10 ms, while it took us 144 s to multiply the image with a number.

One possible way to solve this problem is to use powers-of-two weights such that the multipliers are replaced by shift registers. This means that the weights can only take values on $\{0, 1, \pm 2^{-1}, \pm 2^{-2}, \ldots \pm 2^{-L}\}$, where L is determined by the accuracy required. Thus $$w_i = \sum_{j=1}^{L} w_{ij}$$

where $w_{ij}$ are powers-of-two weights. Multiplication of image $T_i$ by weight $w_{ij} = 2^{-k}$ is realized by left shift of every pixel value by k steps. Clearly, any choice of L gives us an accuracy $\geq 2^{-L}$. Furthermore, L can be chosen from the number of bits used to store each gray scale value. For 256 gray scale values (represented by 8 bits) L can be chosen as 7, and the smallest weight change in step 6 of the enhancement algorithm is $2^{-7}$. This method has the following advantages:
1. We may be able to choose $w_{ij} = 1$ which may be otherwise impossible, and thus reduce computation.
2. Adding/subtracting images with $w_{ij} = 1$ causes no loss of information due to round off errors.
3. Adding/subtracting images has the added benefit of noise reduction due to averaging of the noise. The improvement in image quality (signal-to-noise ratio) is proportional to the square root of L.

Simplified Enhancement Model

In this section we shall consider a simplification of the enhancement model described above. Instead of parameters $P_i = (s_{ai}, s_{bi})$ for individual regions, we shall apply the same parameter set $P = (s_a, s_b)$ and weight w for all regions $R_i$, i=1

... M of the image. The advantages are:
(1) This model is computational efficient, and can be optimized to execute at real-time speeds.
(2) The model allows us to compute a single set of parameters $P=(s_a, s_b)$ and weight w for the entire image.
(3) Since the parameters are the same over the entire image, we do not need any information on the boundaries of regions $\{R_1, \ldots, R_M\}$, to be enhanced.
The new model is:

$$t_i = gs_i + k_1 g s_a + k_2 s_a + k_3 s_i + k_4, \text{ and } u_i = f(wt_i), \text{ and } t_i \in \phi, i=1 \ldots M \quad (16)$$

Generation of Enhanced Image from Known Model Constants

Here we shall estimate offsets $(s_a, s_b)$ and weight w from: (1) known model constants $(k_1, k_2, k_3, k_4)$ and (2) user-specified desired gray scale values $d_i$ for regions $R_i$, $i=1 \ldots M$. The enhanced image T is obtained by modifying input V by estimated offsets $(s_a, s_b)$. The final enhanced image U=wT. From (16), $$d_i = w(gs_i + k_1 g s_a + k_2 s_a + k_3 s_i + k_4), \text{ where } d_i \in \phi, i=1 \ldots M \quad (17)$$

From (17), (g and $s_a$ are unknown), we obtain the following linear equation:

$$[1\ s_i] \begin{bmatrix} w((k_1 g + k_2)S_a + k_4) \\ w(g + k_3) \end{bmatrix} = [d_i], i=1 \ldots M \quad (18)$$

Since (18) is an overdetermined system, the following theorem describes the conditions on $d_i$, $i=1 \ldots M$, under which solutions for g, $s_a$ and w exist.

Theorem

From (18) the necessary and sufficient condition for which solutions for g, $s_a$ and w exist is:

$$\frac{d_i - d_j}{s_i - s_j} = \frac{d_k - d_l}{s_k - s_l},$$

for all i, j, k, l=1, ..., M such that i≠j and k≠l (19)

Proof

For any pair of equations indexed by i and j, the solutions to (18) are:

$$\alpha_{ij} = w(g + k_3) = \frac{d_i - d_j}{s_i - s_j}, \quad (19A)$$

$$\beta_{ij} = w((k_1 g + k_2)s_a + k_4) = d_i - s_i \left(\frac{d_i - d_j}{s_i - s_j}\right) \quad (19B)$$

If (18) has a solution then $\alpha_{ij} = \alpha_{kl}$ and $\beta_{ij} = \beta_{kl}$. Considering only $\alpha_{ij}$ and $\alpha_{kl}$ we get (19). Next we shall show that if (19) is true, then (18) has a solution. In other words, we have to show that $\beta_{ij} = \beta_{kl}$ and $\alpha_{ij} = \alpha_{kl}$ if (19) is true. Clearly, from (19) and (19a) $\alpha_{ij} = \alpha_{kl}$. From (19a)

$$\beta_{ij} = \beta_{kl} = (d_i - d_k) - c(s_i - s_k),$$

where $c = \frac{d_i - d_j}{s_i - s_j} = \frac{d_k - d_j}{s_k - s_j} = \frac{d_l - d_k}{s_l - s_k}$ From this we conclude: $\beta_{ij} - \beta_{kl} = 0$. Therefore, $\beta_{ij} = \beta_{kl}$. Q.E.D.

Theorem 1 shows that we can only choose two independent values of $d_i$ for a single image, the rest of which are fixed by (19). Since we have only two offsets $(s_a, s_b)$, to modify input V (giving us only two degrees of freedom), we can independently choose only two regions for simultaneous enhancement, i.e. M=2. Thus, we shall consider only two regions i and j for enhancement, for the rest of this analysis.

Next, we need to determine a range of (w, g, $s_a$) such that $t_i \in \Phi$ when (w, g, $s_a$) belong to their respective ranges. Assuming $s_i > s_j$, without loss of generality, the range $R(s_a)$ for $s_a$ is (from (10)):

$$R(s_a): \max\left(s_i - \frac{s_{max} - s_{min}}{g}, s_{min}\right) \leq s_a \leq \quad (20)$$

$$s_a \min\left(s_{max} - \frac{s_{max} - s_{min}}{g}, s_j\right)$$

$R(g)$ for gain g is: $R(g): 1 \leq g \leq g_{max}$ (21)

For the nonideal case, we shall first determine a range R(w) for weight w such that when $w \in R(w)$, (g, $s_a$) satisfy (21) and (20) respectively. From R(g) in (21), we get the range $R_1(w)$:

$$R_1(w): \left(\frac{d_i - d_j}{s_i - s_j}\right)\left(\frac{1}{g_{max} + k_3}\right) \leq w \leq \quad (22)$$

$$\left(\frac{d_i - d_j}{s_i - s_j}\right)\left(\frac{1}{1 + k_3}\right)$$

From $R(s_a)$ in (20) we get the range $R_2(w)$:

$$R_2(W): \min_{\substack{g \in R(s) \\ s_a \in R(s_a)}} \left\{ \left(\frac{d_i s_i - d_i s_j}{s_i - s_j}\right)\left(\frac{1}{(k_1 g + k_2)s_a + k_4}\right) \right\} \leq w \leq \quad (23)$$

$$\max_{\substack{g \in R(g) \\ s_a \in R(s_a)}} \left\{ \left(\frac{d_j s_i - d_i s_j}{s_i - s_j}\right)\left(\frac{1}{(k_1 g + k_2)s_a + k_4}\right) \right\}$$

The final range R(w) is: $R(w) = R_1(w) \cap R_2(w)$: (24)

The algorithm for enhancement is as follows:
1. Choose $w \in R(w)$. As before the best selection of w is 1. Otherwise choose w closest to 1 to minimize truncation and round-off errors due to activation function f() in FIG. 1.
2. Compute (g, $s_a$) from (18) satisfying (21) and (20) respectively.
3. Compute high offset $S_b$ from:

$$s_b = s_a + \frac{s_{max} - s_{min}}{g}.$$

Second Order Measures of Desired Gray Scale Values

In all our previous discussions we have only considered the first ordered measures of the desired gray scale values $d_i$. These measures include the mean, median, weighted average and the random sample of $d_i$. All these measures of $d_i$ follow a linear equation in (1). In this section, we shall discuss a second order measure of $d_i$. This measure is the standard deviation $\sigma(d_i)$ of $d_i$. From (1) we obtain: $\sigma(d_i) = w_i(g_i + k_3)\sigma(s_i)$, where $\sigma(s_i)$ is the standard deviation of full range gray scale values $s_i$ in raw image $S_i$.

If we need to enhance the image such that both first and second order measures need to be satisfied, we can modify step 2 of the enhancement algorithm such that $g_i = 1$ is replaced by $$g_i = \frac{\sigma(d_i)}{w_i \sigma(s_i)} - k_3.$$

The rest of the algorithm remains the same. Other second order measures that can also be considered by the above methods are a variation of gray scale values or a range of intensities about the mean.

Figure 2:
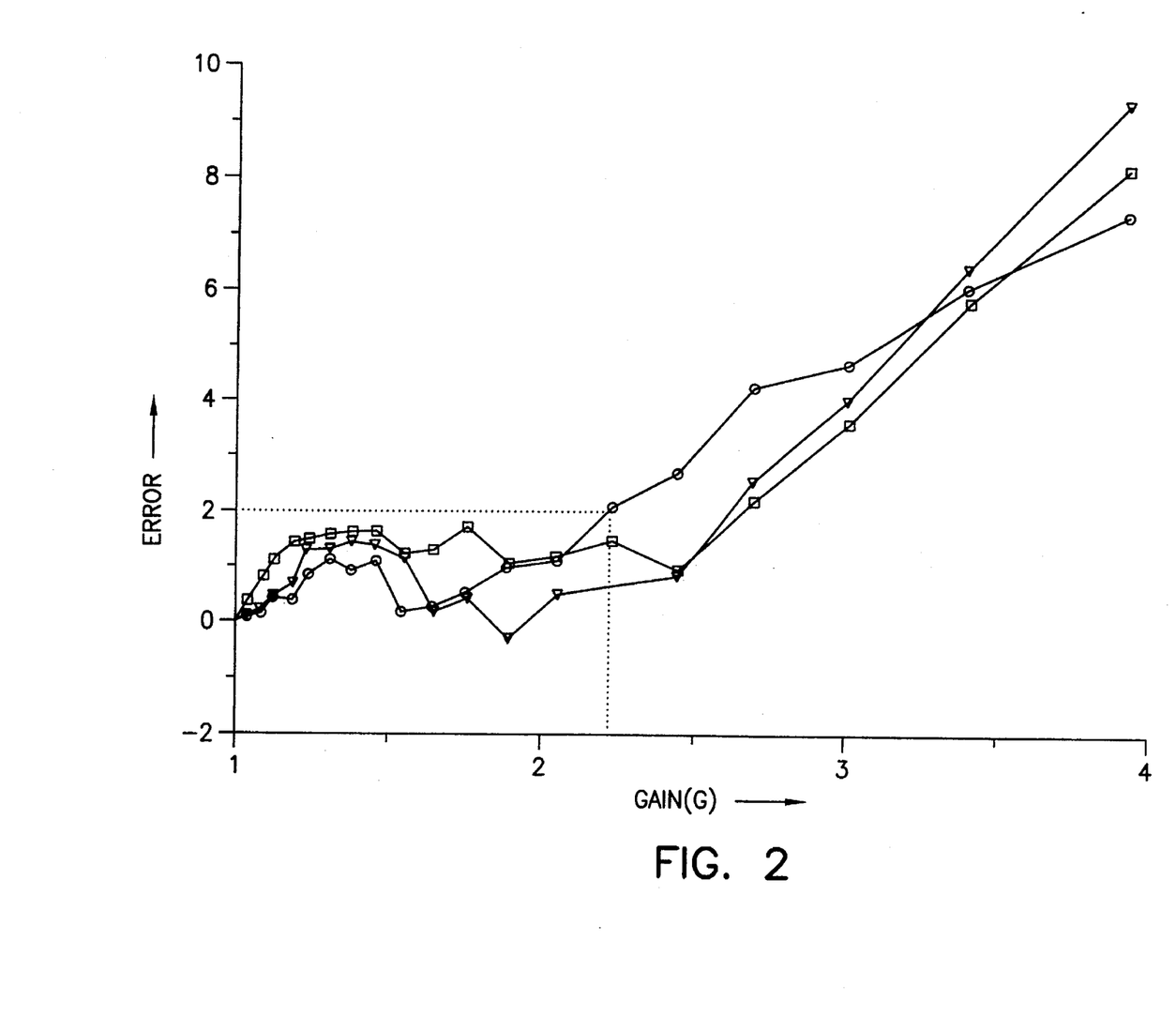
FIG. 2 is a graph of the errors in gray scale values for different gains.

FIG. 2 is a drawing that shows the result of an experiment which demonstrates a typical profile or error in gray scale values vs. gain that is used to estimate $g_{max}$ by the algorithm hereinbefore stated.

Choosing a maximum error of 2 gray scale values, we estimated $g_{max}=2.2$ from FIG. 2. It is clear from FIG. 2, that the errors increase significantly for $g>2.2$. The range of offsets $s_a$ and $s_b$ determined from (5) is: $(s_a+116) \leq s_b$.

FIG. 3A is a graph showing a range $R(s_a)$ of low offset $s_{ai}$ for different values of ADC gain for full range gray scale value $s_i=100$. The lower and upper curves are the lower and upper limits of the low offset $s_{ai}$.

FIG. 3B is a graph showing a range $R(s_{ai})$ of low offsets $s_{ai}$ for different values of ADC gains $g_i$ for full range gray scale values $S_i=200$. The lower and upper curves are the lower and upper limits of the low offset $s_{ai}$.

Figure 4A:
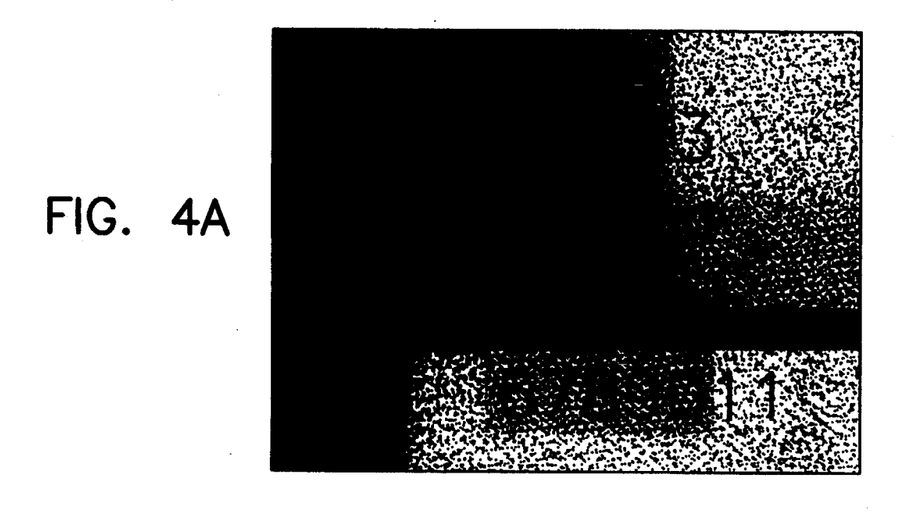
FIG. 4A is a drawing of two industrial steel samples with laser etched characters on them.

FIG. 4A is a drawing of two industrial steel samples with laser etched characters on them. The figure also shows the difference in contrast between the two parts.

Figure 4B:
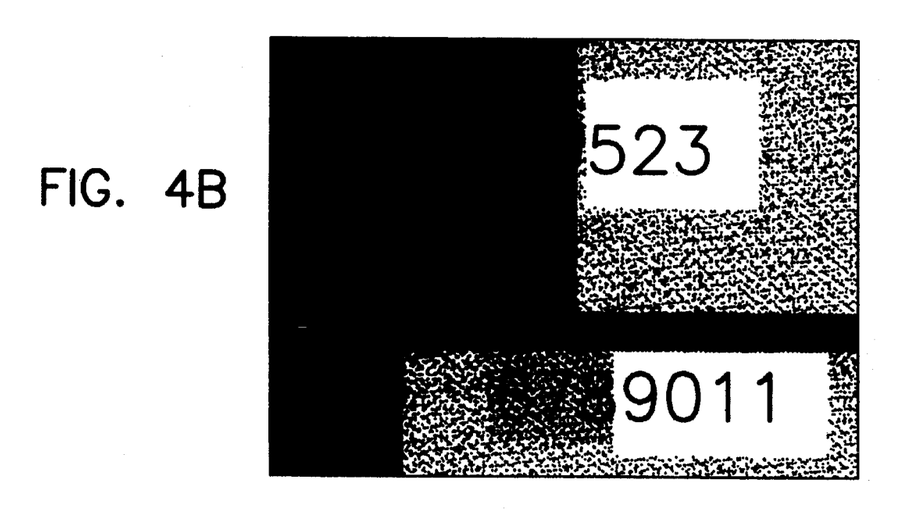
FIG. 4B is a drawing of some characters in each part enhanced by the enhancement model and segmented by a standard segmentation algorithm.

FIG. 4B is a drawing of some characters in each part enhanced by the enhancement model and segmented by a standard segmentation algorithm. FIG. 4B also shows that characters not enhanced by the model are not clearly segmented;

FIG. 5A is a drawing of desired gray scale values $d_i$ that can be obtained for different values of low offsets $_{ai}$ and ADC gain $g_i$ for full range gray scale value $s_i=100$. The figure also shows that all desired gray scale values can be obtained with our model in this case, for weight $w_i=1$.

FIG. 5B is a drawing of desired gray scale values $d_i$ that can be obtained for different values of low offset $s_{ai}$ and ADC gain $g_i$ for full range gray scale value $s_i=200$. The figure also shows that only desired gray scale values $>123$ can be obtained with our model in this case, for weight $w_i=1$;

FIG. 6 is a drawing of full range gray scale values $s_i$ for different values of low offset $s_{ai}$ and ADC gain $g_i$ for $d_i=100$.

The above specification describes new and improved image enhancement system for visual recognition systems. It is realized that the above description may indicate to those skilled in the art additional ways in which the principles of this invention may be used without departing from the spirit. It is, therefore, intended that this invention be limited only by the scope of the appended claims.

What is claimed is:

1. An image enhancement system that enhances images, said system comprising:

means for capturing an analog image signal V of a scene;

first means coupled to said capturing means for digitizing the image to a raw gray scale image S;

means coupled to said digitizing means for processing the raw gray scale image S in accordance with $$t_i = g s_i + k_1 g s_a + k_2 s_a + k_3 s_i + k_4, \ i=1 \ldots M$$

where $t_i$ is a gray scale value, g is a gain, $S_a$ is a low offset, $S_i$ is a full range gray scale value, $k_1, k_2, k_3, k_4$ are constants, and M is a maximum number of regions to be enhanced, to obtain a set of digital enhancement offset parameters P and weights w to produce a processed signal;

means coupled to said processing means for converting the digital enhancement parameters P into analog enhancement parameters Q;

means coupled to said capturing means and said converting means for stretching and clipping the analog signal V by analog enhancement parameters Q;

second means coupled to said stretching and clipping means for digitizing the stretched and clipped analog signal V to produce an enhanced image T;

means coupled to said second means for multiplying said enhanced image T by a multiplying weight w; and means coupled to said multiplying weight w and to said enhanced image signal T for producing an enhanced final image U of the scene.

2. An image enhancement system that enhances images, said system comprising:

means for capturing an analog image signal $V_i$ of a scene;

first means coupled to said capturing means for digitizing the image to a raw gray scale image $S_i$;

means coupled to said digitizing means for processing the raw gray scale image $S_i$ in accordance with $$t_i = g_i s_i + k_1 g_i s_{ai} + k_2 s_{ai} + k_3 s_i + k_4, \ i=1 \ldots M$$

where $t_i$ is a gray scale value, $g_i$ is a gain, $S_{ai}$ is a low offset, $S_i$ is a full range gray scale value, $k_1, k_2, k_3, k_4$ are constants, and M is a maximum number of regions to be enhanced, to obtain a set of digital enhancement offset parameters $P_i$ and weights $w_i$;

means coupled to said processing means for converting the digital enhancement parameters $P_i$ into analog enhancement parameters $Q_i$;

means coupled to said capturing means and said converting means for stretching and clipping the analog signal $V_i$ by analog enhancement parameters $Q_i$;

second means coupled to said stretching and clipping means for digitizing the stretched and clipped analog signal $V_i$ to produce an enhanced image signal $T_i$;

means coupled to said second means for multiplying weight $w_i$ to enhanced image signal $T_i$;

means coupled to said multiplying means for changing the multiplied enhanced image by activation function f() to produce an enhanced image $U_i$ of the scene; and means coupled to said changing means for combining enhanced images $U_i$ to generate a final enhanced image U.

3. The system claimed in claim 2, further including first buffering means whose input is coupled to said first digitizing means and whose output is coupled to said processing means for buffering the input to said processing means.

4. The system claimed in claim 1, further including second buffering means whose input is coupled to said second digitizing means and whose output is coupled to said multiplying means for buffering the input to said multiplying means.

5. The system claimed in claim 2, wherein said capturing means is comprised of an electronic camera.

6. The system claimed in claim 2, wherein said capturing means is comprised of a video camera.

7. The system claimed in claim 2, wherein said capturing means is comprised of a laser.

8. The system claimed in claim 2, further including means for producing L copies of an enhanced image $T_i$.

9. The system claimed in claim 8, wherein said means for producing L copies comprises:

means for decomposing weight $w_i$ into a sum of L powers of two weights, $w_{ij}$;

means for multiplying image $T_i$ with each weight $w_{ij}$; and means for summing the L weighted images.

10. The system claimed in claim 2, further including means for creating a desired gray scale value distribution in each region by varying $w_i$.

11. The system claimed in claim 10, further including means for changing a range of gray scale values.

12. The system claimed in claim 2, further including means for adjusting an illumination of the image.

13. The system claimed in claim 2, further including:

first means for selecting statistical measures of desired gray scale values in the enhanced image;

second means for selecting first order statistical measures such as mean, median, weighted average, or random sample and;

third means for selecting to second order statistical measures such as variance, variation, or range of intensities about the mean.

14. A method of producing an enhanced image, said method comprising the steps of:

capturing an analog image signal $V_i$ of a scene;

digitizing the captured image signal to a raw gray scale image $S_i$;

processing the raw gray scale image $S_i$ in accordance with $$t_i = g_i s_i + k_1 g_i s_{ai} + k_2 s_{ai} + k_3 s_i + k_4, \ i=1 \ldots M,$$

where $t_i$ is a gray scale value, $g_i$ is a gain, $S_{ai}$ is a low offset, $S_i$ is a full range gray scale value, $k_1$, $k_2$, $k_3$, $k_4$ are constants, and M is a maximum number of regions to be enhanced, to obtain a set of enhanced parameter offsets $P_i$ and weights $W_i$ to produce a processed signal;

converting the processed signal into an analog signal that has analog enhancement parameters $Q_1$ by applying a transform function to $V_i$ to both stretch and clip $V_i$;

digitizing the transformed analog signal $V_i$ to produce L copies of an enhanced image signal $T_i$;

multiplying weight $w_i$ to enhanced image signal $T_i$;

changing the multiplied enhanced image by activation function f() to produce an enhanced image $U_i$ of the scene; and combining the enhanced image $U_i$ to generate final enhanced image U.

15. An image enhancement system that enhances images, said system comprising:

means for capturing an analog image signal $V_i$ of a scene;

first means coupled to said capturing means for digitizing the analog signal $V_i$ to a raw gray scale image $S_i$;

means coupled to said digitizing means for processing the raw gray scale image $S_i$ in accordance with an enhancement algorithm to obtain a set of digital enhancement parameters $P_i=(s_{ai}, s_{bi})$, and weights $w_i$;

means of obtaining a separate set of enhancement parameters $P_i=(s_{ai}, s_{bi})$, and weights $w_i$ for each region i of the image;

means coupled to said processing means for converting said digital enhancement parameters into analog enhancement parameters $Q_i=(v_{ai}, v_{bi})$;

means coupled to said capturing means and said converting means for stretching and clipping the analog image signal $V_i$ in accordance with $$F_i(v) = \begin{cases} v_{max}, \\ \left( \dfrac{v_{max} - v_{min}}{v_{bi} - v_{ai}} \right)(v - v_{ai}) + v_{min}, \\ v_{min}, \end{cases}$$

$v > v_{bi}$, $v_{ai} \leq v \leq v_{bi}$, for $v \in V_i$, $v < v_{ai}$ where $V_i$ is clipped at its low and high levels $v_{ai}$ and $v_{bi}$ respectively by analog enhancement parameters $Q_i=(v_{ai}, v_{bi})$;

second means coupled to said stretching and clipping means for digitizing the stretched and clipped analog signal $V_i$ to produce an enhanced gray scale image $T_i$;

means coupled to said second means for multiplying the enhanced gray scale image $T_i$ with weights $w_i$ to produce a multiplied enhanced image $W_i T_i$;

means coupled to said multiplying means for clipping the said multiplied enhanced image with the activation function f() in accordance with $$f(s) = \begin{cases} s_{max}, s > s_{max}, \\ s, s_{min} \leq s \leq s_{max} \\ s_{min}, s < s_{min} \end{cases}$$

to produce a final enhanced image $U_i$ and;

means coupled to said clipping means for combining enhanced images $U_i$ in accordance with $$U = \bigcup_{\text{all regions}} [U=] \cup U_i$$

to generate a final enhanced image U.

16. The system claimed in claim 14, further including:

means for producing L copies of an enhanced image $T_i$.

17. The system claimed in claim 15, further including means of selection M regions for enhancement;

means of applying the enhancement algorithm on each of the said regions to obtain an enhanced image $U_i$;

means of combining enhanced images $U_i$ for each region to obtain final enhanced image U in accordance with $$U = \bigcup_{\text{all regions}} [U=] \cup U_i \ .$$

18. The image enhancement system claimed in claim 14, further including:

means for determining the lower and upper bounds of first and second order measures of desired gray scale values and;

means for selecting measures of desired gray scale values within the said bounds to obtain the desired enhanced gray scale image.

19. The image enhancement system claimed in claim 14 further including:

means for determining a feedback to the system in order to obtain a desired enhancement.

20. An image enhancement system that enhances images, said system comprising:

means for capturing an analog image signal $V_i$ of a scene;

first means coupled to said capturing means for digitizing the analog signal $V_i$ to a raw gray scale image $S_i$;

means coupled to said digitizing means for processing the raw gray scale image $S_i$ in accordance with $$[1 s_i] \begin{bmatrix} w((k_1 g + k_2) s_a + k_4) \\ w(g + k_3) \end{bmatrix} = [d_i], i = 1 \ldots M$$

where $d_i$ is a desired gray scale value for region i, $k_1$, $k_2$, $k_3$, $k_4$ are constants, g is a gain, and M is a maximum number of regions to be enhanced, to obtain a set of digital enhancement parameters $P=(s_a, s_b)$ and weight w;

means for obtaining said enhancement parameters $P=(s_a, s_b)$, and weight w for all regions of the image;

means coupled to said processing means for converting said digital enhancement parameters into analog enhancement parameters $Q=(v_a, v_b)$;

means coupled to said capturing means and said converting means for stretching and clipping the analog image signal $V_i$ in accordance with a transform function $F_i$:

$$F_i(v) = \begin{cases} v_{max}, \\ \left( \dfrac{v_{max} - v_{min}}{v_b - v_a} \right) (v - v_a) + v_{min}, \\ v_{min}, \end{cases}$$

-continued $$\begin{array}{l} v > v_b, \\ v_a \leq v \leq v_b, \text{ for } v \in V_i, \\ v < v_a \end{array}$$

the analog image signal being clipped at its low and high levels $v_a$ and $v_b$ respectively;

second means coupled to said stretching and clipping means for digitizing the stretched and clipped analog signal $V_i$ to produce an enhanced gray scale image T;

means coupled to said second means for multiplying the enhanced gray scale image T with weight w to produce a multiplied enhanced image and;

means coupled to said multiplying means for transforming the said multiplied enhanced image with an activation function f() in accordance with $$f(s) = \begin{cases} s_{max}, & s > s_{max}, \\ s, & s_{min} \leq s \leq s_{max} \\ s_{min}, & s < s_{min} \end{cases}$$

to produce a final enhanced image U.

21. The system claimed in claim 20 wherein said system operates to enhance images to desired measures of gray scale values in real-time speeds.

\* \* \* \* \*